J. BREWER.
Pipe-Wrench with Cutter.
No. 207,102.  Patented Aug. 20, 1878.
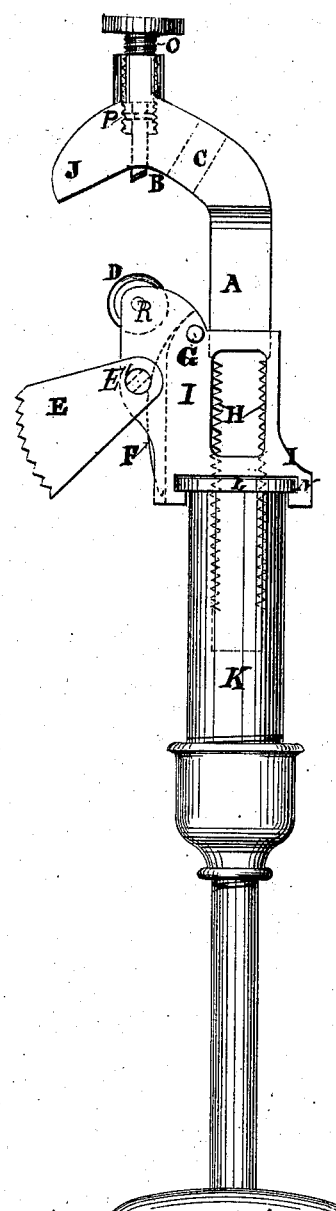
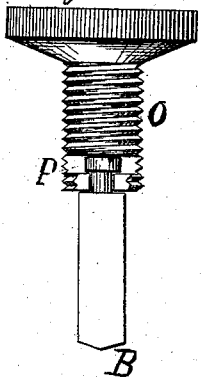
WITNESSES.  
J. P. Case  
Rufus Chancelor
INVENTOR.  
John Brewer  
Per G. Stackpole  
Atty

UNITED STATES PATENT OFFICE.

JOHN BREWER, OF BROOKLYN, NEW YORK.

IMPROVEMENT IN PIPE-WRENCHES WITH CUTTERS.

Specification forming part of Letters Patent No. 207,102, dated August 20, 1878; application filed January 16, 1878.

*To all whom it may concern:*

Be it known that I, JOHN BREWER, of the city of Brooklyn, in Kings county, and State of New York, have invented certain new and useful Improvements in Combined Pipe-Wrench and Pipe-Cutter, which improvement is fully set forth in the following specification and accompanying drawings, in which—

Figure 1 is a side view of my improved combined pipe-wrench and pipe-cutter. Fig. 2 is an enlarged view of the screw and chamfering-tool, showing the swivel-point connecting them.

A is the body of the implement. B is an adjustable burr-scraper or chamfering-tool. C is an opening for the clearance of the chips. D is the cutter, which may be either rotary or stationary. E is a dog that forms the wrench-clutch, and is so arranged as to turn back out of the way when not in use, and is so held by a spring, F.

A stop, G, is provided, to keep the dog E from being forced too hard against the pipe.

A screw-thread, H, is cut on the body of the implement, by means of which a frame, I, carrying the cutter D and the dog E thereon, is moved nearer to or farther from the hook J by turning the handle K, which is attached to the frame I by a flange, L, turning in a recess, N, a screw-thread being cut on the inside of the handle K to correspond to the thread H on the body of the implement.

The burr-scraper or chamfering-tool B is attached to the screw O by a swivel-joint, P, and is arranged in the outer end of the body of the implement, so that the scraper or chamfering-tool B can be adjusted to different-sized pipes; also, so it can be removed for sharpening.

It will be seen that my adjustable scraper and chamfering-tool is adapted to all classes of pipe-cutters.

The burr-scraper or chamfering-tool B follows the cutter D and scrapes off the burr made by the cutter, and chamfers the edge of the cut, and prepares it for the die to cut the thread thereon without the necessity of using the file.

In constructing my wrench and pipe-cutter I make the body A of the implement flat on two sides and round on two sides of the part that enters the handle K, and cut a screw-thread, H, thereon. I make the frame I to fit and slide on this part of the body of the implement, and attach it to the hollow handle K by means of the flange L on the handle entering the circular groove N in the frame I. Said hollow handle has a screw-thread cut on its inner walls to correspond with the screw-thread H on the rounded sides of the body of the implement, and the body of the implement is screwed into the handle after the frame I has been attached to the handle by slipping the flange L into the groove N, so that by turning the handle K the frame I is moved farther from or nearer to the hook J.

A rotary cutter, D, is held in place between the two sides of the frame I by a pin, R, that passes through it and the sides of the frame I.

A dog, E, is attached to the frame I by means of a pin, E', passing through it and through the sides of the frame. Said pin E' is made fast to the dog E, and turns in the frame, and is flattened on two sides.

A flat curved spring, F, is forced under the pin E', between the sides of the frame I, which serves to hold the dog E in position either forward against the work or backward against the handle.

Having thus described my invention, what I claim as new, and desire to secure by Letters Patent, is—

1. The combination of the burr-scraper or chamfering-tool B with the adjusting-screw O, they being connected together by the swivel-joint, and operated in connection with a pipe-cutter, substantially as and for the purpose set forth.

2. The combination and arrangement of the burr-scraper or chamfering-tool B, the screw O, and the body of the implement, having the opening C for the clearance of chips, with the frame I, carrying the cutter D and dog E, substantially as and for the purpose set forth.

3. The opening for the passage of the chamfering-tool, so made that the cutting-edge of said chamfering-tool shall pass through the opening in the V part of the hook on a line, or about on a line, with the center of the cutter D, thereby adapting it with equal facility to all sizes of pipes.

JOHN BREWER.

Witnesses:
 ISAAC N. LEONARD,
 THOS. MURREY.